United States Patent
Peng et al.

(10) Patent No.: US 9,232,388 B2
(45) Date of Patent: *Jan. 5, 2016

(54) INITIATION OF WIRELESS SERVICE

(71) Applicant: Amazon Technologies, Inc., Seattle, WA (US)

(72) Inventors: Shih-Ta Peng, San Marino, CA (US); Andrei V. Vilkotski, Sammamish, WA (US); Siddhartha Singh, Issaquah, WA (US); Yan Zhang, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/606,083

(22) Filed: Jan. 27, 2015

(65) Prior Publication Data

US 2015/0140992 A1    May 21, 2015

Related U.S. Application Data

(60) Continuation of application No. 13/849,007, filed on Mar. 22, 2013, now Pat. No. 8,977,305, which is a continuation of application No. 13/618,872, filed on Sep. 14, 2012, now Pat. No. 8,423,061, which is a division of application No. 12/771,709, filed on Apr. 30, 2010, now Pat. No. 8,364,146.

(51) Int. Cl.
*H04W 4/00*     (2009.01)
*H04W 8/26*     (2009.01)
*G06Q 30/06*    (2012.01)
*H04M 1/27*     (2006.01)
*H04W 8/20*     (2009.01)
*H04W 8/28*     (2009.01)
*H04L 29/08*    (2006.01)

(52) U.S. Cl.
CPC .............. *H04W 8/265* (2013.01); *G06Q 30/06* (2013.01); *G06Q 30/0641* (2013.01); *H04M 1/27* (2013.01); *H04L 67/02* (2013.01); *H04L 67/14* (2013.01); *H04W 8/20* (2013.01); *H04W 8/28* (2013.01)

(58) Field of Classification Search
CPC ........... H04W 4/04; H04W 4/18; H04W 4/20; H04W 80/12; H04W 88/02
USPC .............. 455/466, 551; 705/14.51, 26.1, 27.1
See application file for complete search history.

(56) References Cited

U.S. PATENT DOCUMENTS

| | | |
|---|---|---|
| 8,024,230 B2 | 9/2011 | Zeinfeld et al. |
| 8,107,953 B2 | 1/2012 | Zimmerman et al. |
| 8,364,146 B1 | 1/2013 | Peng et al. |
| 8,423,061 B1 * | 4/2013 | Peng et al. .................... 455/466 |

\* cited by examiner

*Primary Examiner* — Amancio Gonzalez
(74) *Attorney, Agent, or Firm* — Thomas | Horstemeyer, LLP

(57) ABSTRACT

Disclosed are various embodiments for implementing wireless service for a wireless device. In a representative embodiment, a service initiation system is executed in a computing device that communicates with a service provider system over a network to activate a wireless service associated with a newly purchased wireless device. The service initiation system also generates a network page to send to a client over the network, where the network page has a component that initiates a porting of a contact designation associated with a prior wireless device to the newly purchased wireless device separate from the activation of the wireless service for the newly purchased wireless device.

20 Claims, 8 Drawing Sheets

ONLINE WIRELESS

In order to port the number for your new phone(s), please click on the respective port number button indicated below:

123

Phone 1:  It Phone, Model 34WW, Grey, Wireless X  [ Port Number ]

Phone 2:  It Phone, Model 39JI, Grey, Wireless X   233  [ Port Number ]

206

Order Summary

Order Placed: 11/16/10

Email Address: jsmith@email.com

Total Billed by Wireless Express: $56.00

Shipping Address:
Joseph Smith
12345 Peachtree Street
Atlanta, Georgia

Payment Method:
Visa: *****1234
Exp: 01/02/12

Billing Address:
Joseph Smith
12345 Peachtree Street
Atlanta, Georgia

Order Number: GHY3749223876

Order Status: Shipped 11/20/10

Shipping Method: Two Day Shipping

Estimated Delivery: 11/22/10

| Hardware | |
|---|---|
| Phone 1: It Phone, Model 34WW, Grey | $36.00 |
| Phone 2: It Phone, Model 39JI, Grey | $27.00 |
| (Rebate upon activation and porting) | ($60.00) |
| Total Hardware: | $3.00 |

| Service Plan (Billed separately by Wireless X) | |
|---|---|
| Wireless X Nationwide Unlimited Minute Plan | $99.00 |
| Wireless X Nationwide Unlimited Data Plan | $48.00 |
| (Monthly fee reduction after activation and porting) | ($35.00) |
| Service Plan Monthly Total: | $112.00 |

Activation is free of charge!!!!

ONLINE WIRELESS

In order to activate your service and port the number for your new phone(s), please click on the respective buttons indicated below:

123

Phone 1:  It Phone, Model 34WW, Grey, Wireless X  →  [ Activate Service and Port Number ]

Phone 2:  It Phone, Model 39JI, Grey, Wireless X  →  [ Activate Service and Port Number ]

243

Once you click on the buttons above, service for the respective phone will be activated and the telephone number you gave us during checkout will be ported to the phone.

206

Order Summary

Order Placed: 11/16/10

Email Address: jsmith@email.com

Total Billed by Wireless Express: $56.00

Shipping Address:
Joseph Smith
12345 Peachtree Street
Atlanta, Georgia

Payment Method:
Visa: *****1234
Exp: 01/02/12

Billing Address:
Joseph Smith
12345 Peachtree Street
Atlanta, Georgia

Order Number: GHY3749223876

Order Status: Shipped 11/20/10

Shipping Method: Two Day Shipping

Estimated Delivery: 11/22/10

| Hardware | |
|---|---|
| Phone 1: It Phone, Model 34WW, Grey | $36.00 |
| Phone 2: It Phone, Model 39JI, Grey | $27.00 |
| (Rebate upon activation and porting) | ($60.00) |
| Total Hardware: | $3.00 |

| Service Plan (Billed separately by Wireless X) | |
|---|---|
| Wireless X Nationwide Unlimited Minute Plan | $99.00 |
| Wireless X Nationwide Unlimited Data Plan | $48.00 |
| (Monthly fee reduction after activation and porting) | ($35.00) |
| Service Plan Monthly Total: | $112.00 |

Activation is free of charge!!!!

INITIATION OF WIRELESS SERVICE

CROSS-REFERENCE TO RELATED APPLICATION

This application is a continuation of and claims priority to U.S. application Ser. No. 13/849,007, filed Mar. 22, 2013, entitled "Initiation of Wireless Service," which is a continuation of and claims priority to U.S. application Ser. No. 13/618,872, filed Sep. 14, 2012, entitled "Initiation of Wireless Service," now issued as U.S. Pat. No. 8,423,061, which is a division of and claims priority to U.S. application Ser. No. 12/771,709, filed Apr. 30, 2010, entitled "Initiation of Wireless Service," now issued as U.S. Pat. No. 8,364,146, which are hereby incorporated herein by reference in its entirety their entireties.

BACKGROUND

The purchase of wireless devices such as cellular telephones can be technologically difficult to achieve over the Internet due to the fact that service needs to be activated for a wireless device and often a telephone number needs to be ported from a previously existing cellular telephone. For example, users may often wish to delay the porting of a telephone number until they are able to transfer contact information and other data from their old cellular telephone.

This application is a continuation of and claims priority to U.S. application Ser. No. 13/618,872, filed Sep. 14, 2012, entitled "Initiation of Wireless Service," now issued as U.S. Pat. No. 8,423,061, which is a division of and claims priority to U.S. application Ser. No. 12/771,709, filed Apr. 30, 2010, entitled "Initiation of Wireless Service," now issued as U.S. Pat. No. 8,364,146, which is are hereby incorporated herein by reference in its entirety their entireties.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 3 is a drawing of another example of a network page rendered by a client in the networked environment of FIG. 1 according to various embodiments of the present disclosure.

FIG. 4 is a drawing of yet another example of a network page rendered by a client in the networked environment of FIG. 1 according to various embodiments of the present disclosure.

DETAILED DESCRIPTION

In the following discussion, various systems and methods are described to achieve the porting of a contact designation such as a telephone number for a newly purchased wireless device separate from the activation of service for such device. Specifically, a customer defined delay may be imposed between activation of service and the porting of a contact designation as will be described. In the following discussion, a general description of the system and its components is provided, followed by a discussion of the operation of the same.

Figure 1:
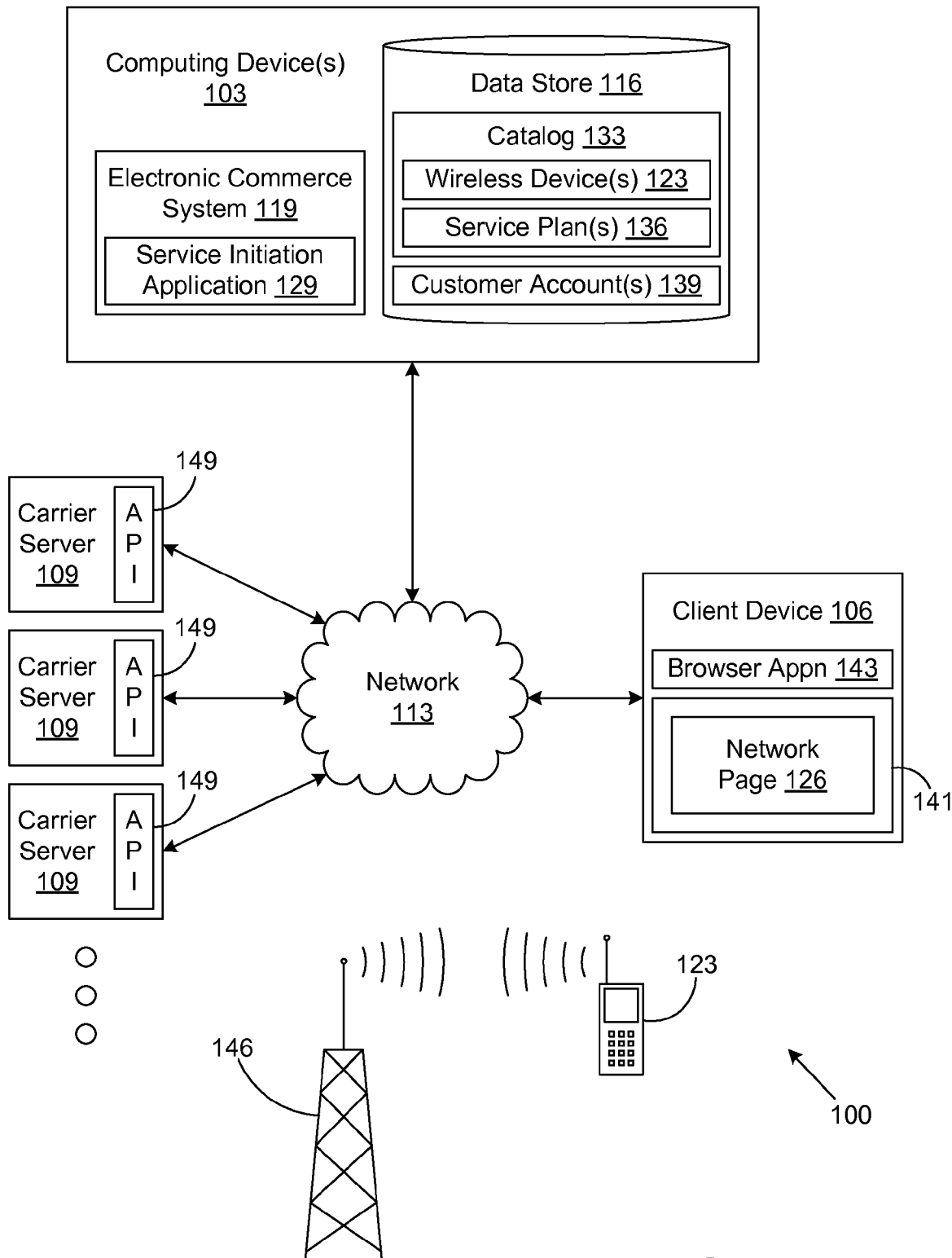
FIG. 1 is a drawing of a networked environment according to various embodiments of the present disclosure.

With reference to FIG. 1, shown is a networked environment 100 according to various embodiments. The networked environment 100 includes one or more computing devices 103, one or more client devices 106, and a plurality of carrier servers 109, each of which is coupled to a network 113. The network 113 includes, for example, the Internet, intranets, extranets, wide area networks (WANs), local area networks (LANs), wired networks, wireless networks, or other suitable networks, etc., or any combination of two or more such networks.

The computing device(s) 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 116 that is accessible to the computing device 103. The data store 116 may be representative of a plurality of data stores as can be appreciated. The data stored in the data store 116, for example, is associated with the operation of the various applications and/or functional entities described below.

The components executed on the computing device 103 include, for example, an electronic commerce system 119 and other systems, applications, services, processes, engines, or functionality not discussed in detail herein. The electronic commerce system 119 is executed in order to facilitate the online purchase of items such as, for example, wireless devices 123 over the network 113. Such wireless devices 123 may comprise, for example, personal digital assistants, cellular telephones, computers, and other devices. However, it is understood that the electronic commerce system 119 may ultimately facilitate the purchase of any type of item. The electronic commerce system 119 also performs various backend functions associated with the online presence of a merchant in order to facilitate the online purchase of items as will be described. For example, the electronic commerce system 119 generates network pages 126 such as web pages or other types of network content that are provided to client devices 106 in response to requests for the purposes of selecting items for purchase, rental, download, lease, or other form of consumption and to perform other tasks as will be described. Among other applications, the electronic commerce system 119 includes a service initiation application 129 that is executed in order to establish service for a wireless device 123 as will be described.

The data stored in the data store 116 includes, for example, a catalog 133 that includes a listing of various items such as, for example, wireless devices 123, and potentially other data. In addition, the catalog 133 includes a listing of service plans 136 that may be sold in association with respective ones of the wireless devices 123. The service plans 136 are offered by various service providers. For example, a service plan 136 may involve wireless service for a wireless device 123. In one embodiment, a wireless device 123 may be sold in association with a given service plan 136 as a package deal, or they may be sold separately. Ultimately, once a wireless device 123 and a service plan 136 are sold, a user may activate the wireless service for a wireless device 123 through various network pages 126 served up by the service initiation application 129 as will be described.

Also stored in the data store 116 are customer accounts 139 that include various information associated with customers that purchase items through the electronic commerce system 119. Such information may include customer name, shipping addresses, billing addresses, payment instruments, shopping carts, wish lists, and other information associated with customers as can be appreciated.

The client device 106 is representative of a plurality of client devices 106 that may be coupled to the network 113. The client device 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability. The client device 106 includes a display device 141 upon which various network pages 126 and other content may be rendered.

The client device 106 may be configured to execute various applications such as a browser application 143 and/or other applications. The browser application 143 may be executed in a client device 106, for example, to access and render network pages 126, such as web pages, or other network content served up by the computing device 103 and/or other servers. The client device 106 may be configured to execute applications beyond browser application 143 such as, for example, email applications, instant message applications, and/or other applications.

In addition, each of the carrier servers 109 is operated by a service carrier so as to provide service, for example, to a wireless device 123 in accordance with a service plan 136 purchased by the customer. Each carrier operates, for example, a wireless network 146 to provide wireless service to the wireless device 123. Each carrier maintains an application programming interface (API) 149 to facilitate communication with outside entities who sell service plans 136 of the respective carrier. Specifically, once a service plan 126 associated with a given carrier is sold, then the service initiation application 129 communicates with the corresponding carrier server 109 through the respective API 149 in order to activate the service for the wireless device 123 and to port a contact designation such as a telephone number from a previous wireless device 123 to the recently purchased wireless device 123 as will be described.

Next, a general description that provides one example of the operation of the various components of the networked environment 100 is provided. To begin, it is assumed that a customer has purchased a wireless device 123 through the electronic commerce system 119 as described above. In addition, it is further assumed that the user has purchased a service plan 136 in order to provide for wireless communication through the wireless device 123. The service plan 136 may be provided by any one of a number of different wireless carriers as can be appreciated.

During the order checkout process, the user is required to enter any porting information for the wireless device 123 to be purchased. The porting information may comprise, for example, the name of a current wireless service provider for the old wireless device 123, an account number associated with such service, the telephone number or other contact designation to be ported, and the name of the customer who purchased the service for the previous wireless device 123. In addition, there may be other information required from the user in the porting information.

It is understood that the porting information may vary depending upon the carrier that provides wireless service to the previously owned wireless device 123. For example, some carriers may require more information, whereas others may require less. Thus, the porting information required to be entered by a user in order to port a contact designation to the newly purchased wireless device 123 may depend upon the service provider of the service plan 136 applied to the previously owned wireless device 123.

When the porting information including a contact designation such as a telephone number is input, the electronic commerce system 119 may perform a check to determine whether the contact designation can be ported at all. That is to say that some contact designations such as telephone numbers cannot be ported for various reasons. As such, the user is thus informed before the checkout process is complete whether they can use a prior contact designation with a new wireless device 123.

Once the purchase is consummated, the wireless service under the service plan 136 needs to be activated so that the wireless device 123 may be used for its purpose such as, for example, making telephone calls, sending and receiving wireless data communications, and other activities. In order to activate a wireless service, a service call may be made to the carrier server 109 associated with the respective wireless carrier through the API 149 presented by that carrier. Such a service call is formatted according to the requirements of the API 149 of the wireless carrier as can be appreciated. Once service is activated, then typically the wireless device 123 may be employed to make emergency calls such as those made through a "911" system. The wireless device 123 may be afforded a temporary contact designation such as a telephone number for use unless such telephone number is to be the primary number for the wireless device 123.

Specifically, for example, if a customer already owns a wireless device 123 and they wish to purchase a new wireless device 123 as a replacement, the customer may already have a contact designation such as a telephone number that they used in conjunction with the prior wireless device 123 that they would like to continue to use with the new wireless device 123. Alternatively, the user may not have previously owned a wireless device 123 and may not actually have a contact designation to use. As such, the contact designation provided upon activation of the wireless device 123 may be designated as the primary contact designation to be used with such device as can be appreciated. In other embodiments, the wireless service upon activation may not provide for inbound communication to the wireless device 123 until the contact designation from the previously owned wireless device 123 is ported to the newly purchased wireless device 123 as can be appreciated.

In order to employ a previously existing contact designation such as a telephone number with a newly purchased wireless device 123, the contact designation from the previously existing wireless device 123 needs to be ported to the new wireless device 123. To do so, the service initiation application 129 may generate one or more network pages 126 in response to requests from the browser application 143 or other application on the client device 106 that are rendered on an appropriate display device 141 of the client device 106 that facilitates a user input to indicate their desire to port the respective telephone number from their old wireless device 123 to the new wireless device 123.

Upon receiving such information and an indication that the user wishes to port the contact designation to the new wireless device 123, the service initiation application 129 as part of the electronic commerce system 119 proceeds to send a message to the appropriate carrier server 109 of the respective wireless carrier in accordance with the API 149 specified by such wireless carrier in order to implement the porting of the contact designation to the new wireless device 123.

Upon receipt of such message, the wireless carrier then proceeds to take action to port the contact designation to the new wireless device 123. After this initial message is sent, then further messages may be sent by the service initiation application 129 to verify whether the porting of the contact designation has been successfully implemented. Such requests may also conform with the API 149 specified by the respective wireless carrier.

According to various embodiments, there may be several different approaches taken for the activation of wireless service for a respective wireless device 123 under a given service plan 136. For example, the merchant selling the wireless device 123 may activate the wireless service by having the service initiation application 129 send the message to the carrier server 109 of the respective wireless carrier to activate the wireless service before the wireless device 123 is shipped to a customer. In an additional alternative, such a message may be sent to cause the activation of the wireless service for the wireless device 123 after a predefined period after the wireless device 123 has been shipped to the customer. This would provide an allowance for time spent by the wireless device 123 in transit to the customer such that they are not paying for wireless service before they actually receive the wireless device 123 or so that activation occurs in such time so as to minimize the time that the customer does not actually have the wireless device 123 after activation.

In this manner, the activation of the wireless service for a given wireless device 123 may be automatic. As an alternative, one or more network pages 126 may be served up to the client device 106 associated with a respective customer that provides for a customer initiation of the activation of wireless service for one or more newly purchased wireless devices 123. In this respect, such network pages 126 may include various components that may be manipulated by a user causing a message to be sent back to the service initiation application 129 indicating that the user wishes for the wireless service to be activated.

In addition, according to various embodiments, subsequent network pages 126 may be generated by the service initiation application 129 at the request of the client device 106 in order to port a contact designation to the newly purchased wireless device 123. In one embodiment, the network page 126 may be served up with one or more components to facilitate initiation of the porting of the contact designation to the newly purchased wireless device 123 separately from any network pages 126 that facilitate activation of the wireless service associated with the wireless device 123. This advantageously allows a customer to cause the porting of the contact designation to the newly purchased wireless device 123 at a time of their choosing.

In one embodiment, the porting of the contact designation as such is noncontemporaneous with the activation of the wireless service associated with the wireless device 123. That is to say, the activation does not occur during the same short period of time or at the same time as the porting of the contact designation. Thus, the service initiation system is advantageously configured to accommodate a random delay imposed by the user between the activation of the wireless service associated with the wireless device 123 and the porting of the contact designation previously used by the customer. This allows a user time to program contact information and potentially other information into the new wireless device 123 from the old wireless device 123 as can be appreciated.

In still another embodiment, a network page 126 may be served up to a customer that facilitates both activation of wireless service and the porting of a contact designation for a given wireless device 123 at the same time. In such case, the customer is given the option of determining when they would like to activate the service and port a contact designation based on their own requirements. This advantageously allows a user to activate service and port a contact designation at the time of their choosing, thereby allowing the customer to transfer contact information and do any other needed functions before activating service and porting a telephone number.

Figure 2:
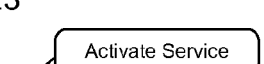
FIG. 2 is a drawing of an example of a network page rendered by a client in the networked environment of FIG. 1 according to various embodiments of the present disclosure.

With reference to FIG. 2, shown is one example of a network page 126 (FIG. 1), denoted herein as network page 126a, that is generated by the service initiation application 129 (FIG. 1) of the electronic commerce system 119 (FIG. 1) according to one embodiment. The network page 126a includes an activation component 203 associated with each wireless device 123 purchased by a user. Also, the network page 126a includes an order summary 206 that lists particulars about a given order including information about the customer, the logistical information for the order (e.g. addresses and payment), and information about detailed charges rendered for the purchase of the respective wireless devices 123 and service plans 136 associated therewith.

The order summary 206 also includes a statement of an incentive 209 provided by the merchant for users both to activate the wireless service and to port a contact designation to their newly purchased wireless devices 123 through the network portal presented by the electronic commerce system 119 and, specifically, the service initiation application 129. The incentive 209 may comprise a monetary incentive such as, for example, a refund of at least part of a price for the purchase of one or more wireless devices 123. The incentive 209 may also comprise a reduction in the price of a service plan 136, or some other benefit as can be appreciated. According to one embodiment, the user may redeem the incentives 209 by activating the wireless service and/or by porting a contact designation through the network portal provided by the electronic commerce system 119 and the service initiation application 129.

According to one embodiment, if a user manipulates the activate component 203 with respect to a given wireless device 123, then an executable portion of the network page 126a sends a message back to the service initiation application 129 that causes the service initiation application 129 to initiate the activation of the wireless service for the respective wireless device 123. In response, the service initiation application 129 proceeds to send an appropriate message to a given carrier server 109 (FIG. 1) associated with a respective carrier through the specified API 149 (FIG. 1) in order to activate service for such wireless device 123.

In addition, any incentives 209 may be applied to the account of the user in the case that the redemption of such incentives 209 occurs upon activation of the respective wireless device 123. Where more than one wireless device 123 is purchased, it may be the case that a user must implement the activation of the wireless service for all of the wireless devices 123 purchased before incentives 209 are redeemed. Thus, each activation component 203 is listed for each respective wireless device 123 in order to activate the wireless service for such wireless devices 123. Alternatively, a single activation component 203 may be associated with a whole group of wireless devices 123 and may correspondingly provide for the activation of all wireless devices 123 in the group.

According to one embodiment, the activation component 203 is a pushbutton. Alternatively, the activation component 203 may comprise many different types of graphical components that achieve its underlying purpose as can be appreciated.

Referring next to FIG. 3, shown is one example of a network page 126 (FIG. 1), denoted herein as network page 126b, according to another embodiment. The network page 126b includes a portion that provides for the porting of a contact designation for a previously existing wireless device 123 to a newly purchased wireless device 123. To this end, the network page 126b includes porting components 233 that comprise pushbuttons or other graphical components that may be manipulated to initiate the porting of a contact designation to the newly purchased wireless device 123. Associated with each porting component 233 is a listing of a wireless device 123 recently purchased, where the porting information needed to port a contact designation for the wireless device 123 was input by the user during checkout as mentioned above.

In order to port a contact designation to the newly purchased wireless device 123, the user may manipulate the respective porting component 233. This causes the network page 126b to send a message to the service initiation application 129 (FIG. 1). Such message comprises a request to initiate the porting of the respective contact designation to the newly purchased wireless device 123. Thereafter, the service initiation application 129 sends a message to the respective carrier server 109 (FIG. 1) of the respective carrier in accordance with the API 149 (FIG. 1) associated with such carrier requesting to implement the porting of the respective contact designation.

With reference to FIG. 4, shown is another example of a network page 126 (FIG. 1), denoted herein as network page 126c, according to another embodiment. The network page 126c includes a portion that provides for both the activation of wireless service and the porting of a contact designation from a previously existing wireless device 123 to a newly purchased wireless device 123. To this end, the network page 126c includes activation and porting components 243 that comprise pushbuttons or other graphical components that may be manipulated to initiate the activation of wireless service and the porting of a contact designation to the newly purchased wireless device 123. Associated with each activation and porting component 243 is a listing of a wireless device 123 recently purchased, where porting information needed to port a contact designation for the wireless device 123 was input by the user during checkout as mentioned above.

The network page 126c also includes the incentives 209 to entice a customer to activate wireless service and port a contact designation through the electronic commerce system 119 that facilitates the purchase of the wireless device 123. This ensures that the seller of the wireless device 123 will get credit for the sale and any commissions for such sale from the wireless service providers as can be appreciated.

In order to activate wireless service and port a contact designation to the newly purchased wireless device 123, the user may manipulate the respective activation and porting component 243. This causes the network page 126c to send a message to the service initiation application 129 (FIG. 1). Such message comprises a request to initiate the activation of wireless service and the porting of the respective contact designation to the newly purchased wireless device 123. Thereafter, the service initiation application 129 sends a message to the respective carrier server 109 (FIG. 1) of the respective carrier in accordance with the API 149 (FIG. 1) associated with such carrier requesting activation of wireless service and requesting the porting of the respective contact designation. In one embodiment, the network page 126c advantageously places control of initiation of activation and porting into the hands of the customer who purchased the wireless device 123. Consequently, the customer is allowed to initiate the activation of the wireless service and the porting of the contact designation at a time of their choosing.

Also, this approach facilitates an initiation of the activation and porting at a time that is noncontemporaneous with respect to the actual time of purchase of the wireless device 123 through the electronic commerce system 119. As a result, customers advantageously maintain control over when activation and porting occur in association with the purchase of a new wireless device 123.

Figure 5:
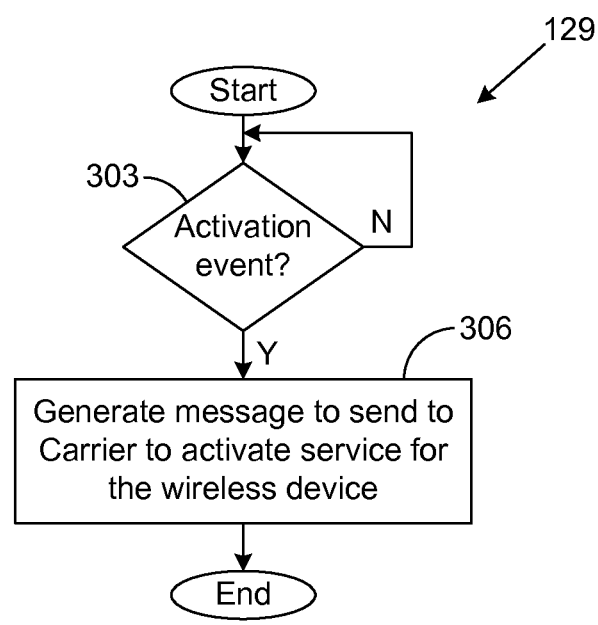
FIG. 5 is a flowchart illustrating one example of functionality implemented as portions of a service initiation application executed in at least one computing device in the networked environment of FIG. 1 according to various embodiments of the present disclosure.

Referring next to FIG. 5, shown is a flowchart that provides one example of the operation of a portion of the service initiation application 129 in activating a wireless service according to various embodiments. It is understood that the flowchart of FIG. 5 provides merely an example of the many different types of functional arrangements that may be employed to implement the operation of the depicted functionality of the service initiation application 129 as described herein. As an alternative, the flowchart of FIG. 5 may be viewed as depicting an example of steps of a method implemented in the computing device 103 (FIG. 1) according to one or more embodiments.

To begin, it is assumed that one or more wireless devices 123 (FIG. 1) and service plans 136 (FIG. 1) have been purchased through the electronic commerce system 119 (FIG. 1). It is understood that it is possible that multiple wireless devices 123 may be purchased that all operate under a single service plan 136. Assuming that the purchase is completed, then wireless service needs to be activated and any porting of a contact designation needs to be performed.

In box 303, the service initiation application 129 waits for an activation event to occur. An activation event comprises an event that indicates that the wireless service associated with one or more wireless devices 123 is to be activated as described above. An activation event may occur, for example, upon detection of a shipping of the device, upon detection of the passing of a predefined period of time after a wireless device 123 has been shipped, or upon a detection that a user has manipulated an activation component 203 (FIG. 2) in order to implement the activation of the wireless service for a respective wireless device 123 as mentioned above. Alternatively, activation events may comprise an occurrence of some other event.

Assuming that an activation event has been detected in box 306, then the service initiation application 129 proceeds to box 306 in order to generate a message to send to a respective carrier server 109 (FIG. 1) to activate service for a respective wireless device 123. The service initiation application 129 may receive an acknowledgement from the carrier. Also, the service initiation application 129 may receive confirmations from the carrier indicating that the activation of the wireless service for one or more wireless devices 123 has been completed.

Figure 6:
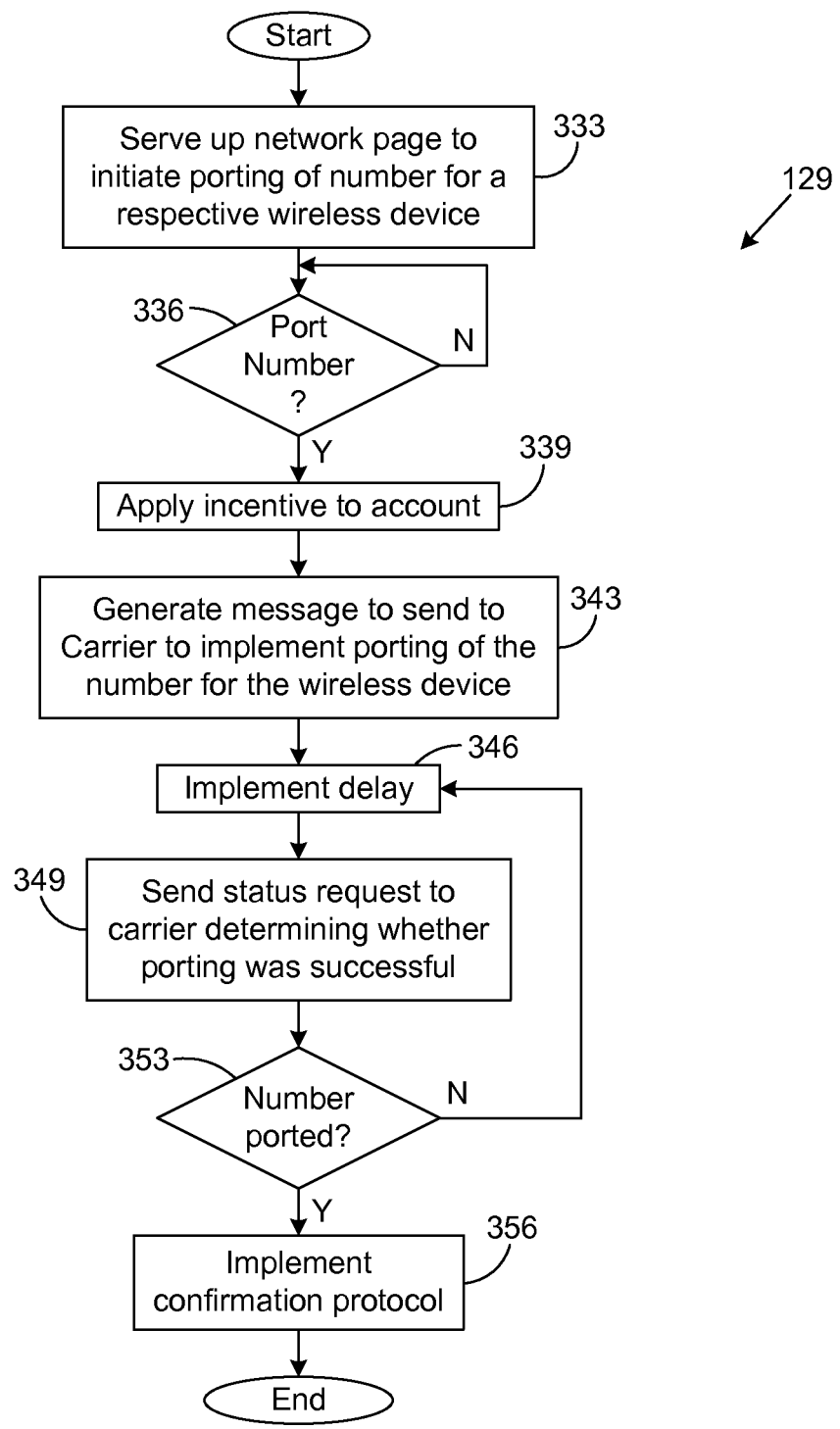
FIG. 6 is a flowchart illustrating another example of functionality implemented as portions of a service initiation application executed in at least one computing device in the networked environment of FIG. 1 according to various embodiments of the present disclosure.

Referring next to FIG. 6, shown is a flowchart that provides one example of the operation of a portion of the service initiation application 129 in porting a contact designation such as a telephone number according to various embodiments. It is understood that the flowchart of FIG. 6 provides merely an example of the many different types of functional arrangements that may be employed to implement the operation of the depicted functionality of the service initiation application 129 as described herein. As an alternative, the flowchart of FIG. 6 may be viewed as depicting an example of steps of a method implemented in the computing device 103 (FIG. 1) according to one or more embodiments.

To begin, in order to port a contact designation such as a telephone number to a newly purchased wireless device 123 (FIG. 1), in box 333 the service initiation application 129 generates and serves up the network page 126*b* (FIG. 3) to present the porting component 233 (FIG. 3) in order to initiate the porting of the contact designation. Thereafter, in box 336 the service initiation application 129 determines whether the porting of the contact designation is to be initiated. This is determined by detecting that the porting component 233 has been manipulated such that a message was received from the respective client device 106 (FIG. 1) as mentioned above. Assuming that the porting of the contact designation is to proceed, then in box 339, the service initiation application 129 may apply any particular incentive 209 (FIG. 2) to be applied to a user account if applicable. Alternatively, box 339 may not exist where incentives 209 are not applied.

Thereafter, in box 343 the service initiation application 129 generates a message to send to a respective carrier to implement the porting of the contact designation for the wireless device 123. Such message includes the porting information as described above. Then, in box 346, the service initiation application 129 implements a delay before determining whether the porting was successful. Then, in box 349, the service initiation application 129 sends a status request to the respective carrier to determine whether the porting was successful. In box 353, if the porting was successful, then the service initiation application 129 proceeds to box 356. Otherwise, it reverts back to box 346 as described above.

In box 346, the service initiation application 129 may implement a confirmation protocol to inform the user that the porting of the contact designation for the respective wireless device 123 was successful. This may comprise, for example, making an automated call to the wireless device 123 associated with the user, sending an email to an appropriate email address designated by the customer, or taking some other action as can be appreciated. Thereafter, this portion of the service initiation application 129 ends.

By virtue of the approach employed to activate a wireless service and port a contact designation separately as described above, the customer maintains control of the implementation of the wireless service and the porting of a contact designation so that they can transfer any information from an obsolete wireless device 123 and potentially perform other tasks before the new wireless device 123 is ready to use.

Figure 7:
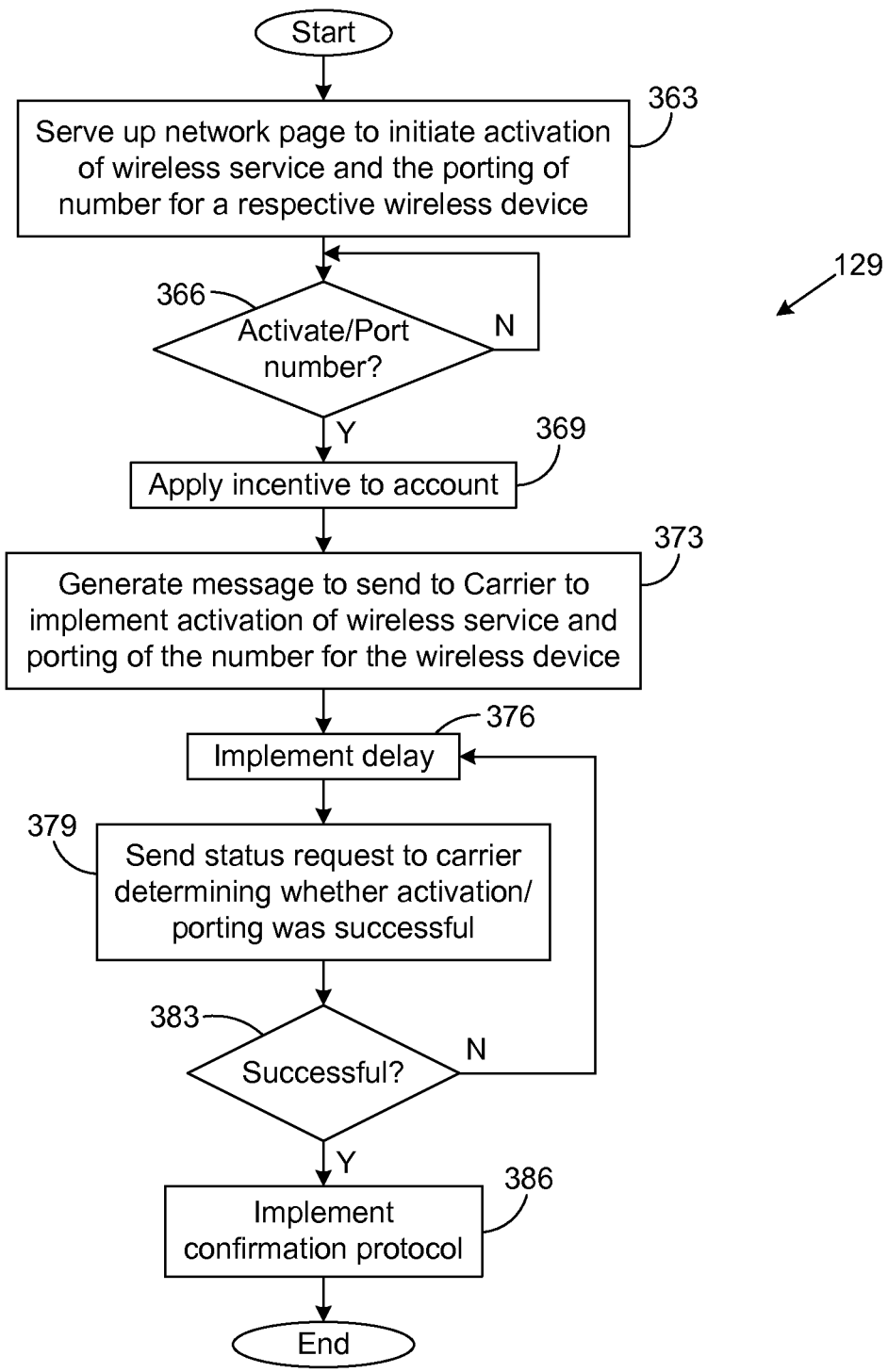
FIG. 7 is a flowchart illustrating yet another example of functionality implemented as portions of a service initiation application executed in at least one computing device in the networked environment of FIG. 1 according to various embodiments of the present disclosure.

Referring next to FIG. 7, shown is a flowchart that provides one example of the operation of a portion of the service initiation application 129 in both activating wireless service and porting a contact designation such as a telephone number according to various embodiments. It is understood that the flowchart of FIG. 7 provides merely an example of the many different types of functional arrangements that may be employed to implement the operation of the depicted functionality of the service initiation application 129 as described herein. As an alternative, the flowchart of FIG. 7 may be viewed as depicting an example of steps of a method implemented in the computing device 103 (FIG. 1) according to one or more embodiments.

To begin, in order to both activate a wireless service and port a contact designation such as a telephone number to a newly purchased wireless device 123 (FIG. 1), in box 363 the service initiation application 129 generates and serves up the network page 126*c* (FIG. 4) to present the porting component 243 (FIG. 4) in order to initiate the activation of wireless service and the porting of the contact designation. Thereafter, in box 366, the service initiation application 129 determines whether the activation and porting are to be initiated. This is determined by detecting whether the porting component 243 has been manipulated such that a message was received from the respective client device 106 (FIG. 1) as mentioned above. Assuming that the activation and porting are to proceed, then in box 369, the service initiation application 129 may apply any particular incentive 209 (FIG. 2) to be applied to a user account if applicable to entice the user to implement activation and porting through the electronic commerce system 119. Alternatively, box 369 may not exist where incentives 209 are not applied.

Thereafter, in box 373 the service initiation application 129 generates a message to send to a respective carrier to both implement the activation of wireless service and the porting of the contact designation for the wireless device 123. Such message may include any needed information about the wireless device 123 and the porting information. Then, in box 376, the service initiation application 129 implements a delay before determining whether the activation and porting were successful. Then, in box 379, the service initiation application 129 sends a status request to the respective carrier to determine whether the activation and porting were successful. In box 383, if the activation and porting were successful, then the service initiation application 129 proceeds to box 386. Otherwise, it reverts back to box 376 as described above.

In box 386, the service initiation application 129 may implement a confirmation protocol to inform the user that the activation and porting of the contact designation for the respective wireless device 123 were successful. This may comprise, for example, making an automated call to the wireless device 123 associated with the user, sending an email to an appropriate email address designated by the customer, or taking some other action as can be appreciated. Thereafter, this portion of the service initiation application 129 ends.

By virtue of the approach employed to activate a wireless service and port a contact designation separately as described above, the customer maintains control of the implementation of the wireless service and the porting of a contact designation so that they can transfer any information from an obsolete wireless device 123 and potentially perform other tasks before the new wireless device 123 is ready to use.

Figure 8:
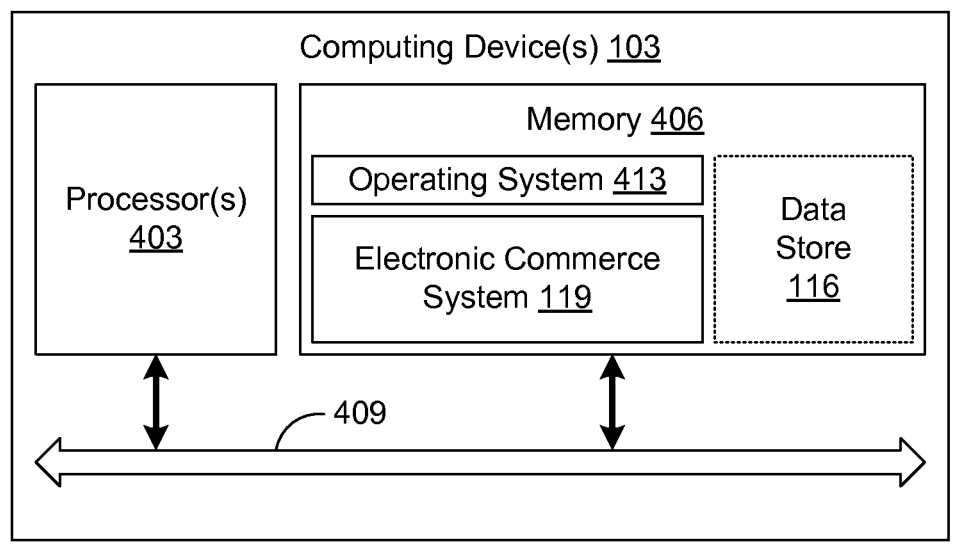
FIG. 8 is a schematic block diagram that provides one example illustration of a computing device employed in the networked environment of FIG. 1 according to various embodiments of the present disclosure.

With reference to FIG. 8, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the electronic commerce system 119, including the service initiation application 129 (FIG. 1), and potentially other applications. Also stored in the memory 406 may be a data store 116 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the electronic commerce system 119, and more specifically, the service initiation application 129, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 5, 6, and 7 show the functionality and operation of an implementation of portions of the service initiation application 129. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 5, 6, and 7 show a specific order of execution, it is understood that the order of execution may differ from that which is depicted. For example, the order of execution of two or more blocks may be scrambled relative to the order shown. Also, two or more blocks shown in succession in FIGS. 5, 6, and 7 may be executed concurrently or with partial concurrence. Further, in some embodiments, one or more of the blocks shown in FIGS. 5, 6, and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 119, and more specifically, the service initiation application 129, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium storing computer-executable instructions that, when executed by one or more computer systems, configure the one or more computer systems to perform operations comprising:
    facilitating acquisition of a first wireless device and a wireless service associated with the first wireless device by a user utilizing a user-computing device;
    communicating with a service provider system over a network to activate the wireless service associated with the first wireless device;
    responsive to receiving a command from the user-computing device, initiating assignment of a contact designation associated with a second wireless device to the first wireless device; and
    imposing a user-defined delay between an activation of the wireless service and the assignment of the contact designation associated with the second wireless device.

2. The non-transitory computer-readable medium of claim 1, wherein the assignment of the contact designation is non-contemporaneous with the activation of the wireless service associated with the first wireless device.

3. The non-transitory computer-readable medium of claim 1, wherein the contact designation comprises a telephone number.

4. A system comprising:
    a data store configured to store at least account data of a user, wherein the user is associated with a first wireless device; and
    a computing device in communication with the data store, the computing device configured to at least:
        facilitate, via a network, purchase of the first wireless device and a wireless service associated with the first wireless device by the user utilizing a user-computing device;
        communicate, via the network, with a service provider system to activate the wireless service associated with the first wireless device; and
        responsive to receiving a user command, initiate assignment of a contact designation associated with a second wireless device to the first wireless device.

5. The system of claim 4, wherein the computing device is further configured to impose a user-defined delay between an activation of the wireless service associated with the first wireless device and the assignment of the contact designation associated with the second wireless device.

6. The system of claim 4, wherein the assignment of the contact designation is non-contemporaneous with the activation of the wireless service associated with the first wireless device.

7. The system of claim 4, wherein the contact designation comprises a telephone number.

8. The system of claim 4, wherein the computing device is configured to communicate with the service provider system responsive to receiving confirmation of occurrence of an activation event.

9. The system of claim 8, wherein the activation event comprises at least one of detection of shipment of the first wireless device to the user; detection of expiration of a predefined period of time after the shipment of the first wireless device to the user; or detection that an activation component has been manipulated by the user.

10. The system of claim 8, wherein the confirmation of occurrence of an activation event is initiated by the user.

11. The system of claim 8, wherein the computing device serves a network page to the user-computing device, the network page having one or more components to facilitate sending the user command from the user-computing device.

12. A computer-implemented method comprising:
    facilitating, via a network, purchase of a first wireless device and a wireless service associated with the first wireless device by a user utilizing a user-computing device;
    communicating with a service provider system to activate the wireless service associated with the first wireless device; and
    responsive to receiving a command from the user-computing device, initiating assignment of a contact designation associated with a second wireless device to the first wireless device.

13. The computer-implemented method of claim 12, further comprising imposing a user-defined delay between an activation of the wireless service associated with the first wireless device and the assignment of the contact designation associated with the second wireless device.

14. The computer-implemented method of claim 12, wherein the assignment of the contact designation is non-contemporaneous with the activation of the wireless service associated with the first wireless device.

15. The computer-implemented method of claim 12, wherein the contact designation comprises a telephone number.

16. The computer-implemented method of claim 12, wherein the communication with the service provider system is responsive to receiving confirmation of occurrence of an activation event.

17. The computer-implemented method of claim 16, wherein the confirmation of occurrence of the activation event is initiated by the user.

18. The computer-implemented method of claim 16, wherein the activation event comprises at least one of: detection of shipment of the first wireless device to the user; detection of expiration of a predefined period of time after the shipment of the first wireless device to the user; or detection that an activation component of a network page has been manipulated by the user.

19. The computer-implemented method of claim 12, further comprising serving a network page with a component to facilitate sending the command from the user-computing device.

20. The computer-implemented method of claim 19, wherein the network page is served separately from an additional network page that facilitates activation of the wireless service associated with the first wireless device.

* * * * *